United States Patent [19]
Ebert

[11] Patent Number: 5,386,582
[45] Date of Patent: Jan. 31, 1995

[54] HIGH SPEED TIME BASE COUNTER IN A FIELD PROGRAMMABLE GATE ARRAY (FPGA)

[75] Inventor: Clint Ebert, Forest Grove, Oreg.

[73] Assignee: Intel Corporation, Santa Clara, Calif.

[21] Appl. No.: 30,802

[22] Filed: Mar. 12, 1993

[51] Int. Cl.$^6$ .............................................. G06F 1/04
[52] U.S. Cl. ................... 395/800; 364/942.7; 364/270
[58] Field of Search ............. 377/29; 364/703; 328/41; 395/800

[56] References Cited

U.S. PATENT DOCUMENTS

| | | | |
|---|---|---|---|
| 4,169,994 | 10/1979 | Nordling | 328/41 |
| 4,553,218 | 11/1985 | Genrich | 364/703 |
| 4,979,193 | 12/1990 | Mehta | 377/29 |
| 5,185,769 | 2/1993 | Wang | 377/29 |

*Primary Examiner*—David Y. Eng
*Attorney, Agent, or Firm*—Gwen L. Lamb

[57] ABSTRACT

A 48-bit counter comprised of twelve four-bit counter stages connected together in a chain of counter stages. Each four-bit counter stage of the chain has a clock enable input and four counter outputs and provides a standard carry output and an early carry output. The early carry output is asserted when a count of the four-bit counter stage is equal to four. The standard carry output is asserted when a count of the four-bit counter stage is equal to 0FH. The standard carry output of the one four-bit counter stage in the chain is connected to the clock enable of the next four-bit counter stage in the chain. An AND circuit is connected to the early carry output of a stage and the four counter outputs of the next stage to thereby provide a next early carry out of the next four-bit counter stage. The standard carry is generated by a pipe. The pipe length of a stage is measured from the early carry to the maximum count of the first stage.

3 Claims, 2 Drawing Sheets

5,386,582

HIGH SPEED TIME BASE COUNTER IN A FIELD PROGRAMMABLE GATE ARRAY (FPGA)

BACKGROUND OF THE INVENTION

1. Field of the Invention

The present invention is related to data processing systems and more specifically to a high speed, synchronous, binary counter implemented in a field programmable gate array.

2. Prior Art

An in-circuit emulator (ICE) duplicates and imitates the behavior of a chip it emulates by using programming techniques and special machine features to permit the ICE to execute micro code written for the chip that it imitates. Microprocessors each have their own reference clocks that provide timings for internal operations. Data and memory addresses are output to an information interchange bus for each microprocessor. In some configurations, two microprocessor information interchange buses are timing related to two mutually asynchronous reference clocks. To capture and display the operation of this configuration it is desirable that the contents of the two information interchange buses be time aligned so that events on both buses can be displayed in sequential order.

Events appear on the information interchange bus. The arrival times of these events are not synchronized to any single clock. In fact, several agents (microprocessors), each synchronized to a different clock frequency, can output events to the bus. The frequency of operation of each microprocessor can change dynamically, such that no one microprocessor always runs faster than all of the other microprocessors.

A module is provided that creates a "time stamp" for each event on two independently clocked trace buffers so that the events captured in the two buffers may be time-aligned. A high-speed time base counter is needed in this module to align the asynchronous events. This allows software to accurately reproduce and chronologically display the bus events of microprocessors that have multiple, asynchronous buses.

Previous designs of wide counters used carry logic which either limited the maximum speed of the counter or caused inaccurate time stamps when cascading from one stage to the next.

It is therefore an object of this invention to provide a counter that runs accurately at high speeds to align asynchronous events in an in-circuit emulator (ICE) bus trace logic.

SUMMARY OF THE INVENTION

Briefly, the above object is accomplished in accordance with the invention by providing a plurality of counter stages connected together in a chain of counter stages. Each stage of the chain being comprised of an n-bit counter. A standard carry output and an early carry output are provided from each counter stage of the chain. The early carry output of the first stage is asserted when a count of the first counter stage is equal to $2^n - w$, where n is the number of bits per stage and w is the number of stages. The early carry output of each stage subsequent to the first stage is asserted when the stage is at its maximum count and the early carry of the previous stage is asserted. The standard carry output provides a clock enable input to a next stage of the chain. The early carry output of one stage and the n counter outputs of the next stage are combined to thereby provide a next early carry out of the next counter stage. The standard carry is generated by a pipe. The pipe length of a stage is measured from the early carry of that stage to the maximum count of the first stage.

An advantage of this invention is that the high speed counter can be used in faster integrated circuit technology and can be ported to a high speed gate array to run at speeds grater than 100 MHz.

A further advantage is that the invention allows software to accurately reproduce and chronologically display the bus events of microprocessors that have multiple. asynchronous buses.

The foregoing and other objects, features, and advantages of the invention will be apparent from the following more particular description of a preferred embodiment of the invention as illustrated in the accompanying drawings.

DESCRIPTION OF THE PREFERRED EMBODIMENT

Figure 1:
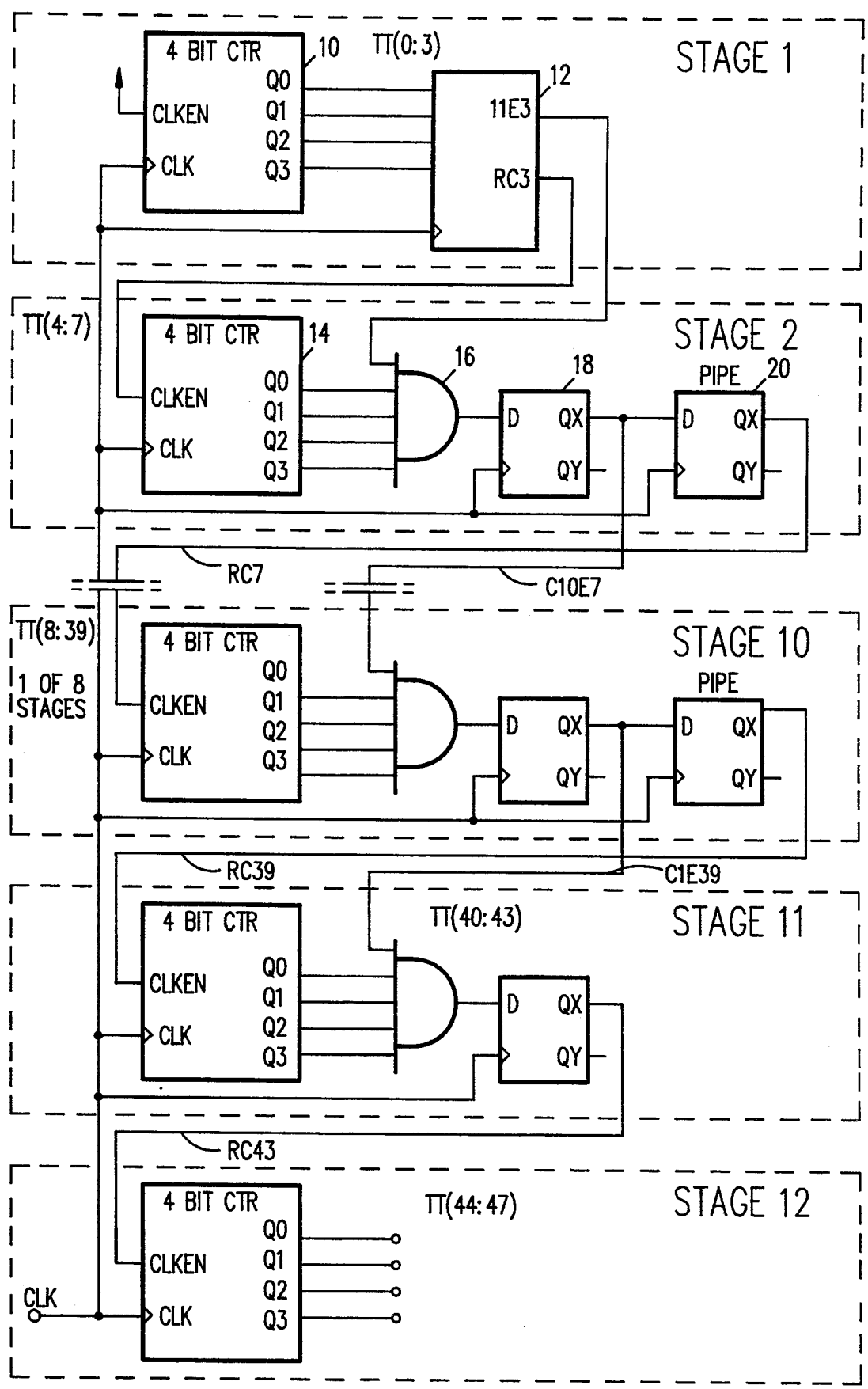
FIG. 1 is a functional block diagram of a counter in which the present invention is embodied; and, FIG. 2 is a timing diagram of the operation of the logic shown in FIG. 1.

FIG. 1 is a block diagram of a counter in which the present invention is embodied. The counter is comprised of 12 stages, STAGE 1, STAGE 2 . . . STAGE 12, shown within the broken lines FIG. 1. The first two stages (STAGE 1 and STAGE 2) and the last three stages (STAGE 10, STAGE 11 and STAGE 12) of the chain are shown in FIG. 1. Stages 3–10 are identical, so only stage 10 is illustrated.

Each stage includes a four-bit counter (10) and a carry logic (12, 16), driven by a common clock input (CLK). Since twelve of these counters are cascaded, 48 bits are provided. Each four-bit counter produces four count outputs (Q0–Q3). An early carry output and a standard ripple carry output are generated at each stage. The standard ripple carry output of each stage is created by piping the early carry output for a number of clocks required to toggle the next stage in the chain and is asserted when the stage count reaches 0FH. The standard carry output is used as the clock enable (CLKEN) for the next stage.

The early carry of the first stage (STAGE 1) is output on a count which is based on the number of stages of the counter. In order to propagate synchronously to the last stage of the counter, the early carry must be asserted on the count of four for a 48-bit counter of twelve stages. The early carry of each stage is combined with the four counter outputs of the next stage to provide the next carry in the chain. This pattern continues until the last stage carry output occurs for one clock on the count of 0FFFFFFFFFFFFH to indicate counter overflow.

The counter of FIG. 1 can be described more generally as follows. A plurality of counter stages, stage 0, stage 1, stage 2 . . . stage s . . . are connected together in a chain of (w) counter stages. Each stage of the chain is comprised of an n-bit counter. A standard carry output and an early carry output are generated from each counter stage of the chain.

The early carry output of the first stage is asserted when a count of the first counter stage is equal to $2^n - w$, where n is the number of bits per stage and w is the number of stages. The early carry output of each stage subsequent to the first stage is asserted when the stage is at its maximum count and the early carry of the previous stage is asserted. The standard carry output provides a clock enable input to a next stage of the chain. The early carry output of one stage and the n counter outputs of the next stage are combined to thereby provide a next early carry out of the next counter stage. The standard carry is generated by a pipe. The pipe length of a stage is measured from the early carry of that stage to the maximum count of the first stage.

Figure 2:
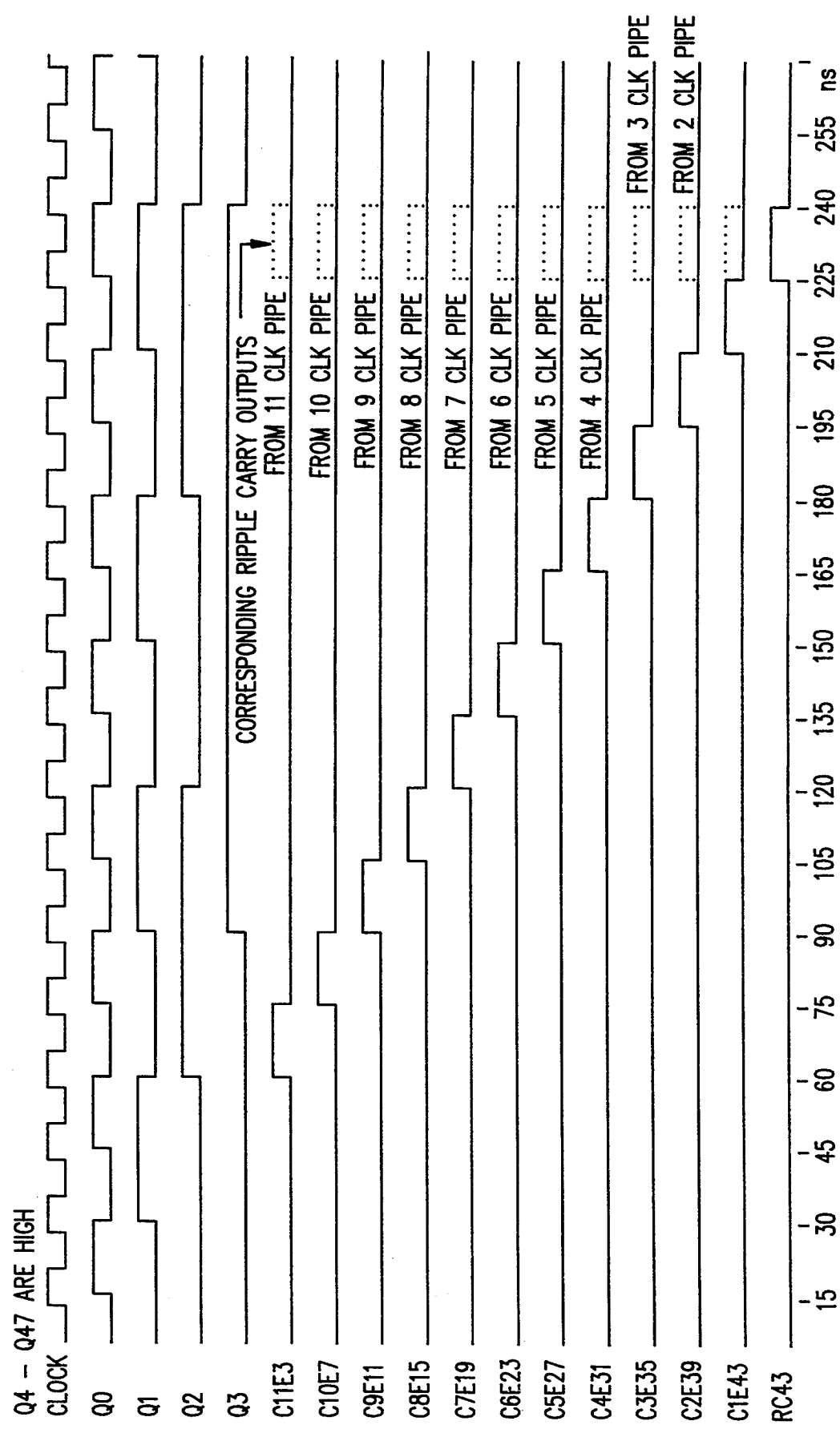

The circuits of FIG. 1 will now be described in more detail and with reference to FIG. 2 which is a timing diagram of the operation of the logic shown in FIG. 1. 10 clocks are required to generate the standard ripple carry (RC7) for STAGE 2. The standard ripple carry output (RC7) of STAGE 2 is created by piping through logic block (20) the early carry output (C10E7) from the logic block (18) for the required number of 10 clocks. The standard carry output (RC7) from logic block (20) is used as the clock enable (CLKEN) for the next stage, STAGE 3 (not shown).

What has been described is a high speed, synchronous, binary counter. In the embodiment shown herein a 48-bit counter implemented in a field programmable gate array which has run accurately at a clock speed of 66.67 MHz creating an accurate binary count with a resolution of 15 nS. The counter can be up to 64 bits wide. The maximum clock speed of the counter using Xilinx 3130-3 FPGA technology is 125 MHz creating an accurate binary count with a resolution of 8 nS. This 125 MHz 64-bit counter would overflow in 4680 years.

While the invention has been particularly shown and described with reference to preferred embodiments thereof, it will be understood by those skilled in the art that the foregoing and other changes in form and detail may be made therein without departing from the scope of the invention.

What is claimed is:

1. A counter comprising:
    a number of counter stages connected together in a chain of counter stages;
    each of said counter stages comprising a four bit counter and a carry logic:
    a first four-bit counter stage of said chain providing a first stage standard carry output and a first stage early carry output;
    said first stage early carry output being asserted when a count of said first four-bit counter stage is equal to four;
    said first stage standard carry output being asserted when a count of said first four-bit counter stage is equal to 0FH;
    a second four-bit counter stage having a clock enable input and four counter outputs;
    said second four-bit counter stage of said chain providing a second stage standard carry output and a second stage early carry output;
    said first stage standard carry output of said first four-bit counter stage being connected to said clock enable of said second four-bit counter stage;
    an AND circuit having inputs connected to said first stage early carry output of said first stage and to said four counter outputs of said second stage;
    an output of said AND circuit being connected to said second stage early carry output of said second four-bit counter stage;
    a third four-bit counter stage of said chain having a clock enable input and four counter outputs; and,
    a pipe connected to said second stage early carry output of said second stage and to said enable input of said third stage;
    said second stage standard carry output being generated by said pipe, a length of said pipe of said second stage being measured from said second stage early carry to a maximum count of said first stage.

2. A counter comprising:
    a plurality of counter stages, stage 0, stage 1, stage 2, ... stage s, ... connected together in a chain of (w) counter stages;
    each stage of said chain being comprised of an n-bit counter;
    first means for providing a standard carry output and an early carry output from counter stage 0 of said chain;
    said stage 0 early carry output being asserted when a count of said stage 0 is equal to $2^n - w$, where n is the number of bits per stage and w is the number of stages in said chain of (w) counter stages;
    said stage 0 standard carry output being asserted when a count of said stage 0 is equal to said stage 0 maximum count;
    second means for providing a clock enable input to stage 1 of said chain;
    said stage 0 standard carry output being connected to said clock enable of said stage 1; and,
    third means connected to said stage 0 early carry output and to said n counter outputs of said stage 1 for providing a stage 1 early carry output of said stage 1.
    fourth means for providing a clock enable input to a stage 2 of said chain;
    a delay means connected to said stage 1 early carry output of said stage 1 and to said enable input of said stage 2;
    said stage 1 standard carry output being generated by said delay means, a length of said delay being measured from said stage 1 early carry to the maximum count of said stage 0.

3. In a counter comprised of a plurality of counter stages, stage 0, stage 1, stage 2, ... stage s-1, stage s, stage s+1 ... connected together in a chain of (w) counter stages, each stage of said chain being comprised of an n-bit counter,
    a method comprising the steps of:
    A. asserting an early carry output of said stage 0 when a count of said stage 0 is equal to $2^n - w$, where n is the number of bits per stage and w is the number of stages;
    B. asserting an early carry output of a stage s subsequent to said stage 0 when said subsequent stage is at its maximum count and an early carry of a previous stage, stage s-1, previous to said subsequent stage is asserted;
    C. using a standard carry output of said previous stage to provide a clock enable input to said subsequent stage;
    D. combining a stage s-1 early carry output of said previous stage and n-bit counter outputs of said subsequent stage to provide a stage s output of said subsequent stage; and,
    E. delaying said stage s-1 early carry output of said stage s-1 to said enable input of said stage s; a length of time of delay being measured from said stage s-1 early carry to a maximum count of said stage 0.

* * * * *